W. D. NASH.
SCALE.
APPLICATION FILED JAN. 13, 1911.
1,024,352.
Patented Apr. 23, 1912.
2 SHEETS—SHEET 1.
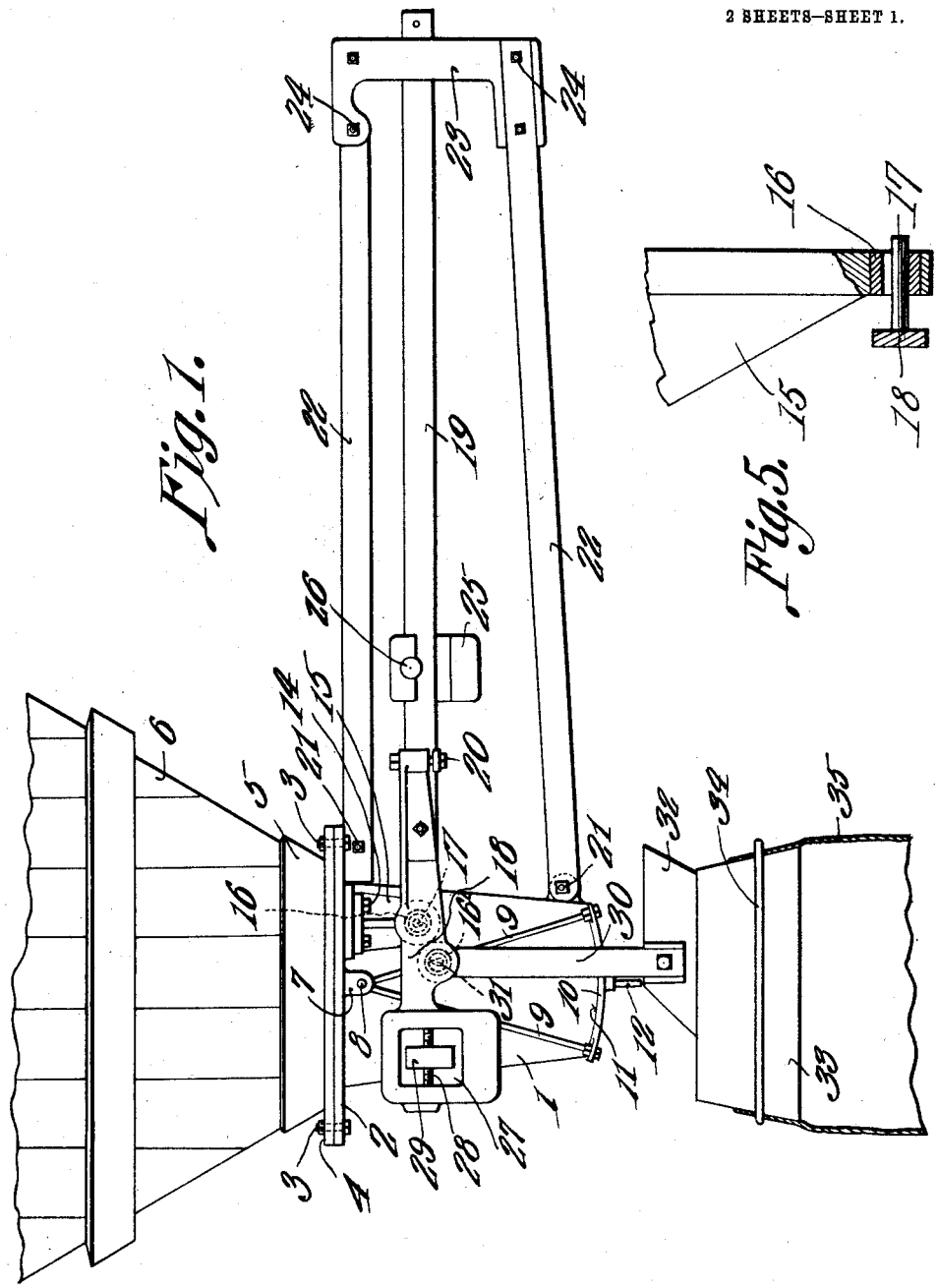
Walter D. Nash,
Inventor
Witnesses
by C. A. Snow & Co.
Attorneys
COLUMBIA PLANOGRAPH CO., WASHINGTON, D. C.

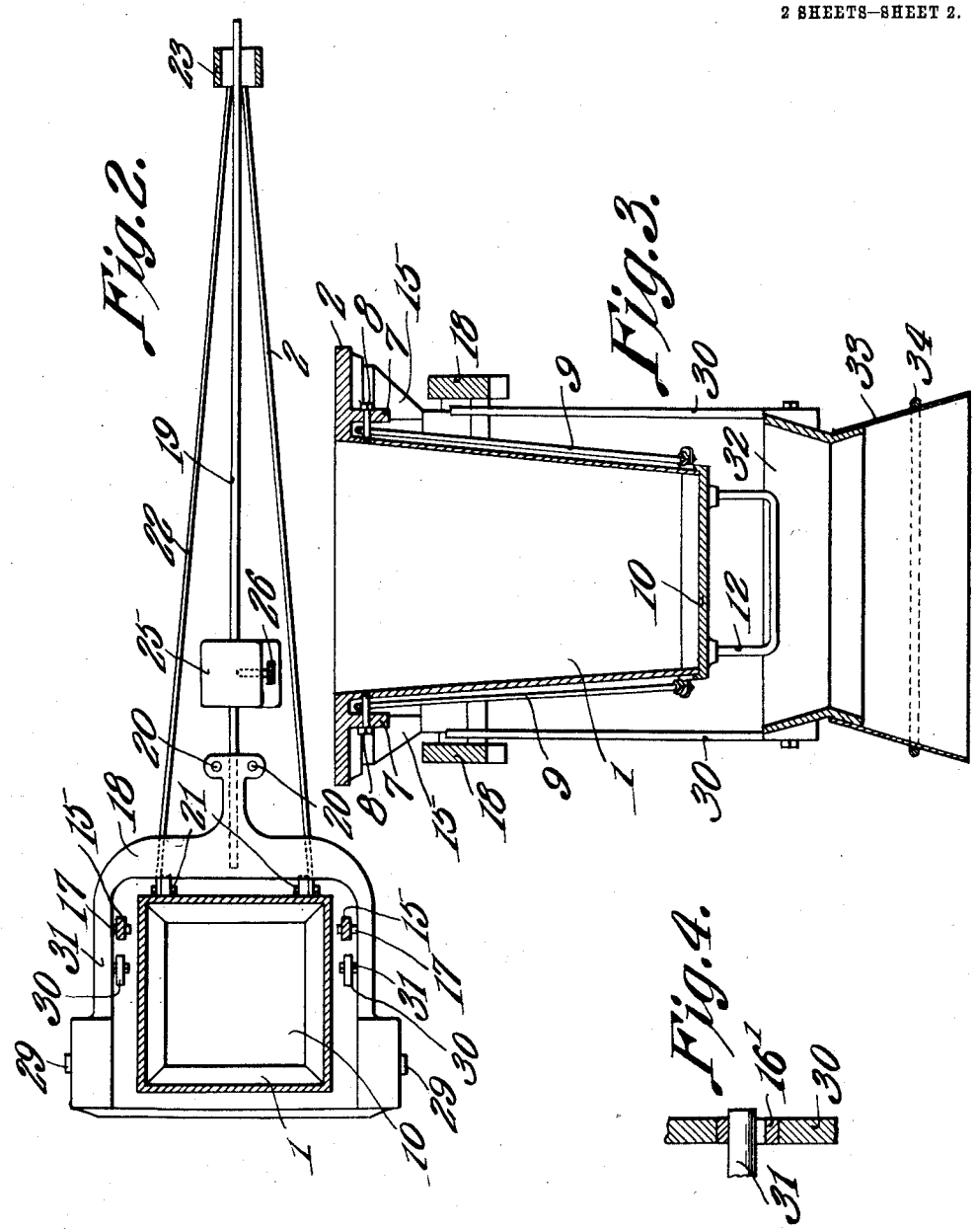

UNITED STATES PATENT OFFICE.

WALTER D. NASH, OF ATLANTA, GEORGIA, ASSIGNOR TO ATLANTA UTILITY WORKS, OF ATLANTA, GEORGIA.

SCALE.

1,024,352.  Specification of Letters Patent.  Patented Apr. 23, 1912.

Application filed January 13, 1911. Serial No. 602,444.

*To all whom it may concern:*

Be it known that I, WALTER DEVEREUX NASH, a citizen of the United States, residing at Atlanta, in the county of Fulton and State of Georgia, have invented a new and useful Scale, of which the following is a specification.

The object of the present invention is to provide a weighing device, adapted to be assembled with a hopper or bin to receive the contents thereof, means being provided whereby the contents of the bin may be delivered into a receptacle for weighing, there being mechanism whereby the flow of the material into the receptacle may be cut off at will.

Another object of the invention is to provide novel means for holding a bag in place upon the weighing device, to receive the contents of the hopper or bin.

A further object of the invention is to provide a weighing mechanism proper, of novel and improved construction, and to equip the same with means whereby the scale beam may be protected.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation; Fig. 2 is a horizontal section; Fig. 3 is a vertical section; and Fig. 4 is a sectional detail showing the pivotal mountings of certain of the poised elements of the structure. Fig. 5 is a side elevation of one of the supporting brackets for the scale beam, showing the manner in which the scale beam is assembled pivotally with the brackets, parts being sectioned.

In carrying out the invention there is provided a hopper 1, preferably in the form of a truncated tetragonal pyramid, provided adjacent its upper end with an outstanding flange 2, adapted to be united by means of bolts 3, or in any other manner, with a mating flange 4, formed upon the lower end of a collar 5, adapted to be secured to the bin or hopper 6, in which the material to be weighed, is stored.

Depending from the flange 2, upon opposite sides of the hopper 1, are integrally formed lugs 7, carrying pins 8, upon which are pivoted diverging swing rods 9, carrying at their lower ends, a closure 10, adapted to fit closely, yet slidably, against the lower end of the hopper 1. The lower end of the hopper 1 and the closure 10 are disposed in an arc, as indicated at 11 in Fig. 1, the center from which this arc is struck, being the center of the pivot pin 8. The closure 10 may be equipped with a suitable handle 12, whereby the closure may be withdrawn from beneath the hopper 1, thus permitting the contents of the bin 6, to flow downwardly out of the hopper 1, into a receptacle, supported upon the weighing mechanism in a manner to be described hereinafter.

By means of bolts 14, or other securing elements adapted to a like end, depending brackets 15 are secured to the flange 2 of the hopper 1, in front of the lugs 7. These brackets 15 are bored to receive bushings 16, in which are seated loosely, knife edge pins 17, projecting inwardly from the arms of a Y shaped yoke 18, to form a pivotal mounting for the yoke. The yoke 18 carries an outstanding scale beam 19, suitable connecting mechanism 20 being employed for uniting the scale beam with the yoke.

By means of bolt and lug connections 21, converging arms 22 are secured to the hopper 1, above and below the scale beam 19, the arms 22 carrying, at their free extremities, and adjacent the free end of the scale beam 19, an annular casing 23, in which the end of the scale beam 19 is inclosed, the casing 23 being bolted, or otherwise secured to the arms 22, as shown at 24.

Slidably mounted upon the scale beam 19, is a weight 25, held in place by a set screw 26 or other clamping means. The rear portions of the yoke 18 are equipped with openings 27, across which extend screws 28, upon which are threaded counter-poise weights 29.

The invention further includes depending supporting members 30, positioned upon either side of the hopper 1, the supporting members being bored out to receive bushings 16′, after the manner of the showing of Fig. 4. These bushings receive knife edged pins 31, projecting inwardly from the yoke 18, the pins 31 being positioned between the fulcrum pins 17 and the counter-poise weights 29. The lower ends of the supporting members 30 are united with a hood 32, equipped with a conical, downwardly flaring base 33, upon which rests a ring 34.

In practical operation, the ring 34 is slid upwardly upon the base 33, a bag 35 being slipped between the ring 34 and the base, whereupon the ring is permitted to drop downwardly, to engage the bag 35. It will be seen that as the weight of material in the bag 35 increases, the upper extremity of the bag will be held the more tightly between the ring 34 and the base 33 of the hood. After the bag 35 has been mounted in place, the handle 12 of the closure 10 is engaged, the closure being swung to one side, upon its pivotal mounting 8, to open the lower end of the hopper 1, whereupon the contents of the bin 6 will flow into the bag 35. The weight 25 having been clamped in a predetermined position upon the scale beam 19, by means of the set screw 26, material from the bin 6 will flow into the bag 35 until the scale beam 19 is tilted upon its fulcrum pins 17, whereupon the member 10 may be slid manually into closed position, cutting off further flow from the bin 6 into the bag 35.

The weight 25 may be removed entirely from the scale beam 19, whereupon a proper poise may be secured by manipulating the weights 29.

The arms 22 and the casing 23 serve as a guard to protect the scale beam 19 from injury, the construction being such that the scale beam cannot be struck readily, from below, from above, or from either side.

By manipulating the ring 34, the bag 35 may readily be mounted in place, and the construction is such that the greater the weight, the more firmly will the bag be held in place, the bag, however, not being likely to be torn, no matter how great be the weight which the bag supports.

Having thus described the invention what is claimed is:—

In a device of the class described, a hopper; swing rods pivotally connected with the hopper; a closure for the bottom of the hopper, carried by the swing rods, the lower end of the hopper and the closure being disposed in an arc of which the pivotal mounting of the swing rods is a center; a scale beam; a yoke connected with the scale beam and having diverging arms extended upon the outside of the swing rods; means for pivotally connecting the yoke with the hopper; suspension members pivotally connected with the yoke, and located upon the outside of the swing rods; a hood secured to the lower ends of the swing rods; and a handle secured to the closure and located between the suspension members, when the closure is extended across the bottom of the hopper.

In testimony that I claim the foregoing as my own, I have hereto affixed my signature in the presence of two witnesses.

WALTER D. NASH.

Witnesses:
J. WAYNE MOORE,
HERBERT B. DAVIS.

---

Copies of this patent may be obtained for five cents each, by addressing the "Commissioner of Patents, Washington, D. C."